(12) United States Patent
Ishikawa et al.

(10) Patent No.: US 8,177,128 B2  
(45) Date of Patent: May 15, 2012

(54) INFORMATION PROCESSING DEVICE FOR CARD-LIKE RECORDING MEDIUM

(75) Inventors: Kazutoshi Ishikawa, Nagano (JP); Kazunori Takahashi, Nagano (JP)

(73) Assignee: Nidec Sankyo Corporation (JP)

( * ) Notice: Subject to any disclaimer, the term of this patent is extended or adjusted under 35 U.S.C. 154(b) by 212 days.

(21) Appl. No.: 12/447,165

(22) PCT Filed: Oct. 22, 2007

(86) PCT No.: PCT/JP2007/001148  
§ 371 (c)(1), (2), (4) Date: Nov. 12, 2009

(87) PCT Pub. No.: WO2008/050481  
PCT Pub. Date: May 2, 2008

(65) Prior Publication Data  
US 2010/0108768 A1  May 6, 2010

(30) Foreign Application Priority Data  
Oct. 24, 2006 (JP) ................................ 2006-288640

(51) Int. Cl.  
*G06K 5/00* (2006.01)  
*G06K 7/08* (2006.01)

(52) U.S. Cl. ........ 235/380; 235/375; 235/449; 235/486; 235/493

(58) Field of Classification Search ................... 235/375, 235/380, 440, 454, 449, 470, 493, 494, 486, 235/475, 483; 358/400, 401, 408; 382/135, 382/137, 139, 140  
See application file for complete search history.

(56) References Cited

U.S. PATENT DOCUMENTS

| | | | |
|---|---|---|---|
| 5,434,404 A * | 7/1995 | Liu et al. ........................ | 235/475 |
| 5,473,148 A | 12/1995 | Tanaka et al. | |
| 6,394,344 B1 * | 5/2002 | Katsumura et al. ........... | 235/380 |
| 7,252,233 B2 * | 8/2007 | Takiguchi ...................... | 235/454 |
| 2005/0087598 A1 * | 4/2005 | Yamanaka et al. ............ | 235/440 |
| 2005/0127160 A1 * | 6/2005 | Fujikawa ....................... | 235/379 |
| 2005/0127182 A1 * | 6/2005 | Nagata et al. ................. | 235/454 |
| 2005/0145689 A1 * | 7/2005 | Osawa et al. .................. | 235/379 |
| 2005/0242172 A1 * | 11/2005 | Murata .......................... | 235/380 |
| 2006/0043182 A1 * | 3/2006 | Kinoshita ...................... | 235/449 |

FOREIGN PATENT DOCUMENTS

| | | |
|---|---|---|
| JP | 3-116577 A | 5/1991 |
| JP | 7-65104 A | 3/1995 |
| JP | 8-255209 A | 10/1996 |
| JP | 11-134454 A | 5/1999 |
| JP | 11-241968 A | 9/1999 |
| JP | 2002-259902 A | 9/2002 |

OTHER PUBLICATIONS

International Search Report for International Application No. PCT/JP2007/001148 mailed Jan. 15, 2008 with English Translation.

* cited by examiner

*Primary Examiner* — Tuyen K Vo  
(74) *Attorney, Agent, or Firm* — Cantor Colburn LLP

(57) ABSTRACT

A processing device for a card-like recording medium may include a path for transferring the recording medium, a frame including a first frame and a second frame, a detector structured to detect presence of the recording medium, an imager structured to capture an image record on the recording medium. The detector may be placed in the frame before the imager in a transfer direction of the recording medium. The information processing device may further include a neutralizing member structure to remove static electricity charged in the recording medium, the neutralizing member being placed between the imager and the detector.

10 Claims, 5 Drawing Sheets

INFORMATION PROCESSING DEVICE FOR CARD-LIKE RECORDING MEDIUM

CROSS REFERENCE TO RELATED APPLICATIONS

This is a U.S. national stage of application No. PCT/JP2007/001148, filed on Oct. 22, 2007. Priority under 35 U.S.C. §119(a) and 35 U.S.C. §365(b) is claimed from Japanese Application No. 2006-288640, filed Oct. 24, 2006; the contents of which are also incorporated herein by reference.

FIELD OF THE INVENTION

The present invention relates to an information processing device for a card-like recording medium, which reads and processes information recorded on a paper-made or plastic card-like information recording medium.

BACKGROUND

Conventionally known is an information processing device of a swiping type, in which a card is manually swiped in a guide (a card path) for reading information recorded on the card. "Swiping" to be described in this specification means an operation of sliding a card-like recording medium manually along the guide (a card path) of the information processing device.

An information processing device of such a swiping type is equipped with an image scanner for capturing image data by taking an image from a pattern on a card surface, such as a 2D(dimensional) bar code. The image scanner is a reduction-type optical image scanner for example (Refer to Patent Document 1, Japanese Unexamined Patent Application Publication No. 2002-259902, for example). The reason for using such a reduction-type optical image scanner is that a depth of field of the reduction-type optical image scanner is so deep that focusing can be done easily even under condition where a relative distance of the card from a scanning surface changes somewhat as the card is slid (swiped).

Unfortunately, if the reduction-type optical image scanner is applied, a certain length of optical path is required. As a result, the size of the entire device is likely to become large. Particularly, the reduction-type optical image scanner is not suitable for using as an image scanner to be installed in a mobile information processing device that is transferable. Furthermore, being compared with other types of scanners such as a contact-type image scanner, the reduction-type optical image scanner is more expensive, and therefore it is not preferred for an image scanner to be installed in a mobile information processing device that sells at a low unit price.

From the viewpoint described above, a mobile information processing device equipped with not the reduction-type optical image scanner but the contact-type image scanner is now under review. Being compared with the reduction-type optical image scanner, the contact-type image scanner is shallower in depth and compact, and therefore it is suitable for a mobile information processing device.

However, the information processing device equipped with the contact-type image scanner has the following problems. When being manually swiped along the guide (card path), a card once held by an operator's hand may be charged with static electricity and it passes through the guide (card path). Therefore, the static electricity may be discharged to the image scanner to result in malfunction and breakdown of the image scanner.

To prevent the static electricity charged in the card from being discharged to the image scanner, the guide (card path) may be constructed with any conductive material such as a metal for removal of the static electricity. However, if the entire part of the guide (card path) is constructed with the conductive material, the information processing device becomes heavy. For weight saving, a conductive resin material containing carbon may be used for the guide. However, required for such a construction is a conductive resin material containing carbon that is generally expensive, and the material eventually increases the production cost. Using the conductive resin material only for a bottom of the guide (card path) solves the problems of the weight saving and the production cost. But the card swiped manually may not contact the bottom sometimes, and in such a case the static electricity cannot be removed for sure.

Therefore, there is a need for a processing device for a card-like recording medium that more surely prevents malfunction and breakdown of the image scanner owing to static electricity, while keeping the static electricity charged in the card from being discharged to the image scanner at the time of swiping the card manually.

SUMMARY

To achieve the advantage described above, at least an embodiment of a processing device may provide the following aspects.

(1) A processing device for a card-like recording medium including: a path for transferring a card-like recording medium; a frame including a first frame and a second frame, the first and second frames facing each other and sandwiching the path; a detecting means for detecting presence of the card-like recording medium traveling through the path, the detecting means being present at the path; and an imaging means for capturing an image recorded on the card-like recording medium, the imaging means being present at the path; wherein the detecting means and the imaging means are placed in the frame in this order along a transfer direction of the card-like recording medium, and the information processing device further includes a neutralizing means for removal of static electricity charged in the card-like recording medium, the neutralizing means being placed between the imaging means and the detecting means.

At least an embodiment of a processing device for a card-like recording medium includes: the frame having the first frame and the second frame, the first and second frames facing each other and sandwiching the path; the detecting means for detecting presence of the card-like recording medium traveling through the path; and the imaging means for capturing the image recorded on the card-like recording medium. The detecting means and the imaging means are placed in the frame in this order along the transfer direction of the card-like recording medium. The neutralizing means for removal of static electricity charged in the card-like recording medium is placed between the imaging means and the detecting means. Therefore, it is enabled to prevent malfunction and breakdown of the imaging means owing to static electricity charged in the card-like recording medium.

More specifically, since the neutralizing means is placed at an upstream position before the imaging means in the transfer direction of the card-like recording medium, the static electricity charged in the card-like recording medium is discharged to the neutralizing means, before being discharged to the imaging means. Therefore, the neutralizing means can prevent the static electricity from being discharged to the imaging means, and eventually it enables prevention of malfunction and breakdown of the imaging means owing to static electricity further surely.

The neutralizing means placed between the imaging means and the detecting means enables discharge of the static electricity further surely. Therefore, while only the neutralizing means being manufactured with a conductive material, the entire device except the neutralizing means may be formed with an inexpensive material such as a resin. Thus, this disposition enables weight saving and production cost reduction of the processing device for a card-like recording medium.

(2) The processing device for a card-like recording medium: wherein the imaging means includes a scanning surface for reading the image recorded on the card-like recording medium, and the imaging means is so placed as to have the scanning surface being present at the first frame; the second frame includes a pressing member, which is so located as to face the scanning surface across over the path and to press the card-like recording medium in a direction toward the scanning surface while the card-like recording medium traveling through the path; and furthermore the first frame includes a guide for keeping a distance of the card-like recording medium from the scanning surface constant while the card-like recording medium traveling through the path.

At least an embodiment of the imaging means is so placed as to have the scanning surface being present at the first frame; the second frame includes the pressing member, which is so located as to face the scanning surface across over the path and to press the card-like recording medium in the direction toward the scanning surface while the card-like recording medium traveling through the path; and the first frame includes the guide for keeping the distance of the card-like recording medium from the scanning surface constant while the card-like recording medium traveling through the path. Therefore, this disposition prevents the scanning surface from being damaged by traveling operation of the card-like recording medium.

Moreover, this disposition ensures reading the image (information) recorded on the card-like recording medium further correctly. To describe more in detail, for reading the image (information) recorded on the card-like recording medium correctly, it is preferable to have the card-like recording medium travel close to the scanning surface of the imaging means, and it is also required to keep the constant distance of the card-like recording medium from the scanning surface. At least an embodiment of the pressing member presses the card-like recording medium in the direction toward the scanning surface so as to locate the card-like recording medium close to the scanning surface, and the guide placed in the first frame ensures the constant distance between the card-like recording medium and the scanning surface. Therefore, the card-like recording medium travels close to the scanning surface while keeping the constant distance from the scanning surface. As a result, the image (information) recorded on the card-like recording medium can be read further correctly.

(3) The processing device for a card-like recording medium: wherein the imaging means includes a cover made of an optically-transparent material, and one side of the cover is the scanning surface while the other side of the cover is an adhesive surface adhering to the imaging means; and the neutralizing means is so placed as to be present at the path, being protruded further (i.e., positioned at a closer side) toward the path in comparison with the adhesive surface between the cover and the imaging means, and still being at a closer position in the path toward the first frame in comparison with the scanning surface.

At least an embodiment of the imaging means includes the cover made of the optically-transparent material, and one side of the cover is the scanning surface while the other side of the cover is the adhesive surface adhering to the imaging means. The neutralizing means is so placed as to be present at the path, being protruded further (i.e., positioned at a closer side) toward the path in comparison with the adhesive surface between the cover and the imaging means, and still being at a closer position in the path toward the first frame in comparison with the scanning surface (For example, not to protrude over the scanning surface in a direction toward the second frame, namely to be indented inside in a direction away from the second frame). Therefore, the static electricity can be discharged further surely without causing any damage on the card-like recording medium, and the image (information) recorded on the card-like recording medium can be read further correctly.

Namely, when the neutralizing means is placed at the same lateral position as the adhesive surface between the scanning surface (i.e, the cover/the glass plate) and the imaging means, the static electricity charged in the card-like recording medium may be discharged to the imaging means before being discharged to the neutralizing means. Placement of the neutralizing means being protruded further (i.e., at a closer side) toward the path in comparison with the adhesive surface prevents the static electricity for more sure from breaking in through the adhesive surface.

Moreover, if the neutralizing means is placed at the same lateral position as the scanning surface, the card-like recording medium may come into contact with the neutralizing means so as to get damaged when traveling through the path. On the other hand, placement of the neutralizing means at a laterally lower position than the scanning surface prevents the neutralizing means from coming into contact with the card-like recording medium traveling through the path. Furthermore, since the neutralizing means is present at the path, the static electricity can be discharged further surely even though the neutralizing means is positioned to be a little lower than the scanning surface.

Eventually, when the neutralizing means is placed at a position that is laterally higher than the adhesive surface of the imaging means and laterally lower than the scanning surface of the same in the path, the static electricity can be discharged further surely without causing any damage on the card-like recording medium traveling the path.

If a glass plate constitutes the cover, a clearer image can be captured in comparison with a case of constituting the cover with a resin plate so that the image (information) recorded on the card-like recording medium can be read further correctly.

(4) The processing device for a card-like recording medium: wherein the imaging means becomes enabled for image capturing according to an output from the detecting means.

In at least an embodiment, since the imaging means becomes enabled for image capturing according to an output from the detecting means, the imaging means is switched into enabled condition for image capturing at the last minute prior to capturing operation so that power consumption can be restrained. To describe more in detail, in order for the imaging means to capture the image (information) of the card-like recording medium, the imaging means requires being switched from stand-by condition to enabled condition for image capturing. If the switching operation is done manually for example, the imaging means needs to become enabled for image capturing before transferring the card-like recording medium. Therefore, a period of keeping enabled condition for image capturing becomes long, and power consumption accordingly increases. In at least an embodiment, the imaging means becomes enabled for image capturing after the start of transferring the card-like recording medium but before capturing the image, the period of keeping enabled condition for image capturing becomes short, and power consumption can be restrained accordingly.

When the card-like recording medium travels in a wrong direction, the imaging means does not operate to restrain power consumption, and furthermore it is enabled to prevent malfunction and breakdown of the imaging means owing to static electricity. To describe more in detail; the detecting means, the neutralizing means, and the imaging means are placed in this order along the transfer direction of the card-like recording medium. Therefore, when the card-like recording medium travels in the right direction (transfer direction), the neutralizing means can protect the imaging means as described above. Meanwhile, when the card-like recording medium travels in a direction opposite to the transfer direction, the imaging means does not operate at first so that it is enabled to prevent malfunction and breakdown of the imaging means even though the static electricity is discharged.

(5) The processing device for a card-like recording medium: wherein a wall made of an insulating material is placed between the detecting means and the neutralizing means.

At least an embodiment of the wall made of an insulating material is placed between the detecting means and the neutralizing means. Therefore, the insulating material blocks the static electricity discharged from the card-like recording medium to the neutralizing means, and eventually prevents the static electricity from being discharged secondarily to the detecting means. Furthermore, since the insulation wall allows the detecting means and the imaging means to be placed further closed each other, it becomes possible to switch the imaging means into enabled condition for image capturing at the last minute prior to capturing operation so that the period of keeping enabled condition for image capturing becomes further short, and consequently power consumption can be further restrained.

(6) The processing device for a card-like recording medium: wherein the imaging means is a contact-type line sensor.

At least an embodiment of the imaging means for capturing the image recorded on the card-like recording medium is a contact-type line sensor. Therefore, using the contact-type line sensor that is generally inexpensive enables production cost reduction. Furthermore, since the contact-type line sensor consumes less power and ensures compact design, it becomes possible to provide a processing device for a card-like recording medium that is able to restrain power consumption and excellent in portability and practicality.

(7) The processing device for a card-like recording medium: wherein the neutralizing means is made of a material for removing static electricity, the material being formed to have sharp tips toward the path.

At least an embodiment of the neutralizing means is made of a material for removing static electricity, the material being formed to have sharp tips toward the path. When static electricity concentrates around the sharp tips of the material for removing static electricity, the tips can easily attract static electricity, and therefore the static electricity charged in the card-like recording medium can be discharged further effectively.

(8) The processing device for a card-like recording medium: wherein the information processing device further comprises a circuit board placed in the frame; and the neutralizing means is connected to a ground terminal of the circuit board by using a cable.

At least an embodiment of the processing device for a card-like recording medium further comprises the circuit board placed in the frame; and the neutralizing means is connected to the ground (earth) terminal of the circuit board by using the cable. Therefore, the static electricity charged in the card-like recording medium can be discharged easily to the ground terminal.

(9) The processing device for a card-like recording medium: wherein the frame is constructed with the first frame, the second frame, and a transfer base level existing between the first frame and the second frame, the frame being U-shaped.

At least an embodiment of the frame is constructed with the first frame, the second frame, and the transfer base level existing between the first frame and the second frame, and eventually the frame is U-shaped. A simple construction of the frame enables compact design and production cost reduction of the information processing device.

(10) The processing device for a card-like recording medium: wherein a part of the second frame facing the scanning surface is able to get opened freely.

At least an embodiment of the part of the second frame facing the scanning surface is able to get opened freely, and therefore the scanning surface can always be kept free of contamination.

The processing device for a card-like recording medium gets contaminated easily with dust and dirt on the scanning surface, and it is difficult to clean the contamination because of the structure of the device. If dust and dirt adhere to the scanning surface, the dust and dirt are also captured in the image at the time of scanning operation. That may result in not only incorrect reading but also damages on the card-like recording medium.

In at least an embodiment, at the time of cleaning the scanning surface, the part facing the scanning surface is opened to expose the scanning surface. Then, the dust and dirt adhering to the scanning surface can be removed further surely. The part facing the scanning surface is equipped with the pressing member, and therefore exposing the scanning surface also makes the pressing member visible at the opposite side as well. Accordingly, dust and dirt adhering to the pressing member such as the roller can be removed for sure. As the dust and dirt adhering to the pressing member can be removed, they are not transferred to the scanning surface of the scanner. Since the scanning surface can always be kept free of contamination, the image can be read correctly without causing any damage on the card-like recording medium.

As described above, in the information processing device, the neutralizing means prevents the static electricity charged in the card-like recording medium from being discharged to the imaging means, and namely it prevents malfunction and breakdown of the imaging means owing to static electricity. Furthermore, since the neutralizing means ensures discharge of the static electricity further surely, it becomes possible to construct the entire device with an inexpensive material such as a resin, and that results in weight saving as well as production cost reduction of the processing device for a card-like recording medium. Moreover, including the frames equipped with the guide and the pressing member, this disposition makes it possible to keep the distance between the scanning surface and the card-like recording medium constant at the time when the information processing device reads information recorded on the card-like recording medium. As a result, scanning operation can be done more precisely, and removal of static electricity can be carried out stably while the card-like recording medium being placed close to the neutralizing means.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

An embodiment of the present invention is described below with reference to the accompanying drawings.

Figure 1:
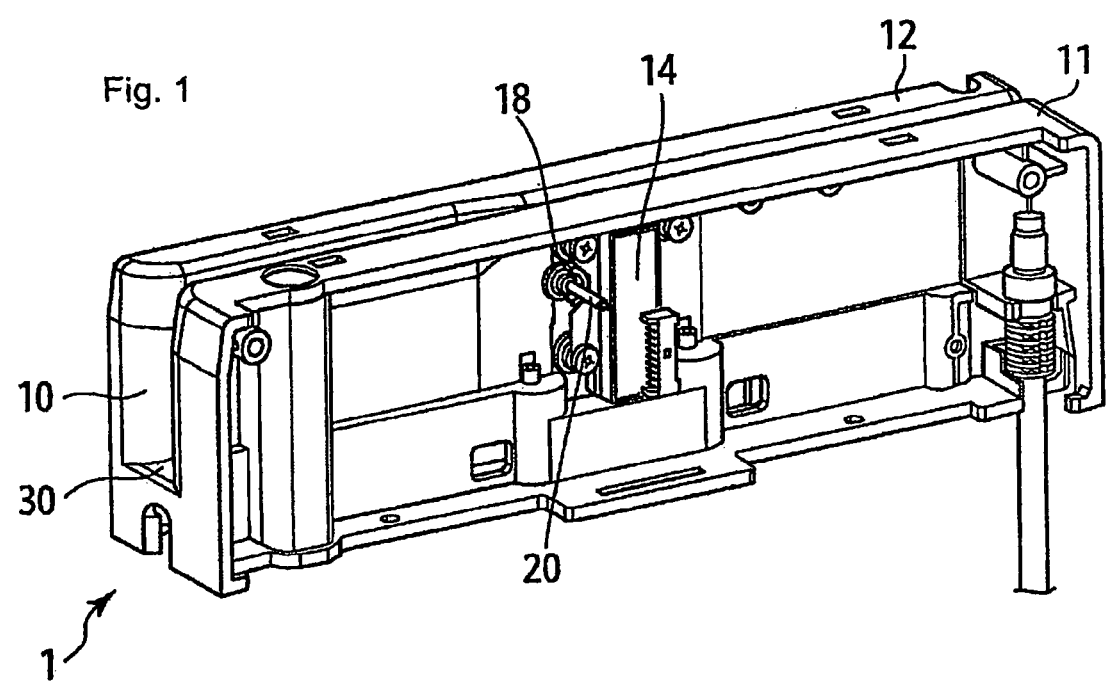
FIG. 1 is a perspective view showing an external appearance of a structure of a processing device for a card-like recording medium according to an embodiment of the present invention.
Figure 2A:
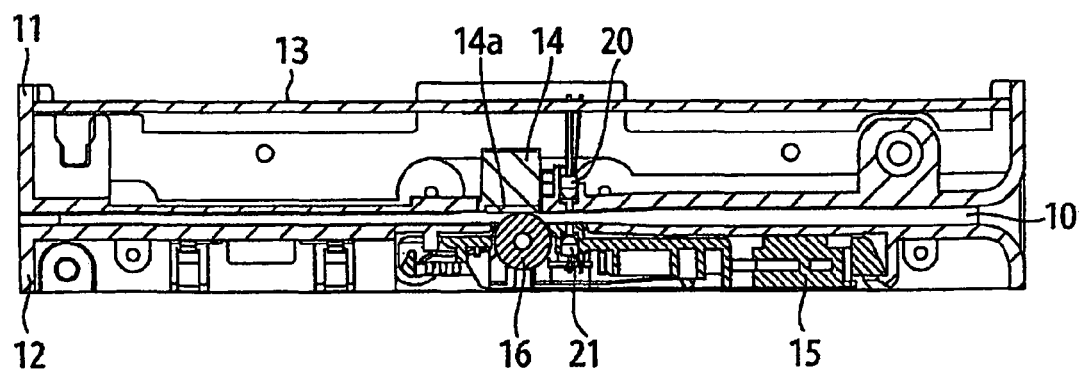
FIGS. 2(a) and 2(b) are cross-sectional views showing a mechanical composition of the processing device for a card-like recording medium according to the embodiment of the present invention.
Figure 2B:
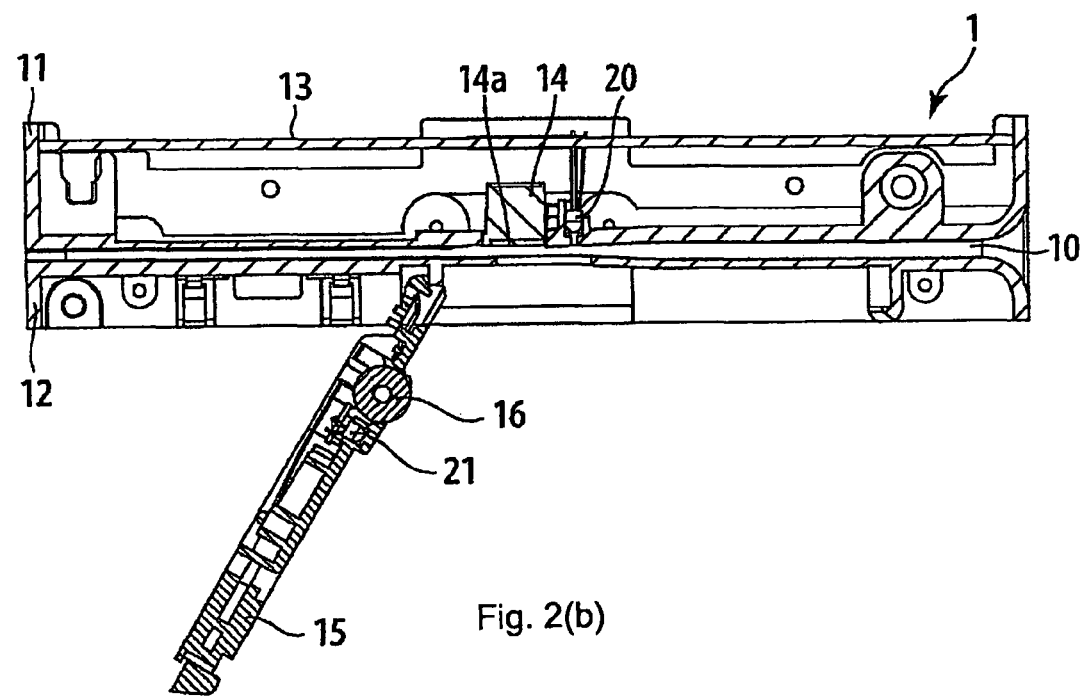

FIG. 1 is a perspective view showing an external appearance of a structure of an information processing device 1 for a card-like recording medium according to an embodiment of the present invention. FIGS. 2A and 2B are cross-sectional views showing a mechanical composition of the information processing device 1 for a card-like recording medium according to the embodiment of the present invention. While a support plate 15 is fixed to a second frame 12 in FIG. 2A, the support plate 15 is opened to expose a scanning surface 14a of a contact-type image scanner 14 in FIG. 2B.

In FIG. 1 and FIGS. 2A & 2B, the information processing device 1 (of a swiping type) for a card-like recording medium includes; a first frame 11 having a contact-type image scanner 14 for scanning an image on a card-like recording medium (having a barcode or an OCR character for example); a second frame 12 facing the first frame 11 across a path 10 and having a roller 16 that presses the card-like recording medium against a scanning surface 14a of the contact-type image scanner 14; and a transfer base level 30 formed between the first frame 11 and the second frame 12. The first frame 11, the second frame 12, and the transfer base level 30, as a whole, construct a frame almost U-shaped in its sectional view (Refer to FIG. 1).

In the contact-type image scanner 14, a beam of light radiated from a light source through the scanning surface 14a reaches the card-like recording medium. Then, a photo acceptance unit such as a photo diode or a CCD for example receives a reflected light beam coming from the card-like recording medium to capture an image on the card-like recording medium.

For the scanning surface 14a, a plastic plate or a glass plate may be used as a member for the scanning surface. In the present embodiment, the scanning surface 14a is constructed with a glass plate 14b so that it can take a clearer image. In the embodiment, the contact-type image scanner 14 is just an example as the imaging means, and any other type of sensor such as one of various kinds of contact-type line sensors may be used instead.

In the information processing device 1 for a card-like recording medium, the support plate 15 is equipped with an LED 21 (light emitting device) that radiates a beam of light toward the card-like recording medium, meanwhile the first frame 11 has a read start sensor 20 (photo acceptance unit) for receiving the beam of light from the LED 21. The read start sensor 20 is mounted on a control board 13. According to an output from the read start sensor 20, the contact-type image scanner 14 becomes enabled to take an image (read start). The read start sensor 20 is just an example as the detecting means.

In the second frame 12, the support plate 15 supporting the roller 16 is installed at a position facing the scanning surface 14a, one end of the support plate 15 being suspended on a shaft so that the support plate 15 can be opened. The support plate 15 supports the roller 16 so as to make the roller 16 movable between two positions; i.e., one as a fixed position (Refer to FIG. 2A) where the roller 16 is present at the path, and the other as an opened position (Refer to FIG. 2B) where the scanning surface 14a of the contact-type image scanner 14 is exposed.

The roller 16 is just an example as the pressing member, and it is preferable that the roller 16 is made of an elastic material. Being made of such an elastic material, the roller 16 changes its shape according to a shape of the card-like recording medium. As a result, without having any damage, the card-like recording medium can be pressed for sure in a direction toward the scanning surface 14a.

Figure 3A:
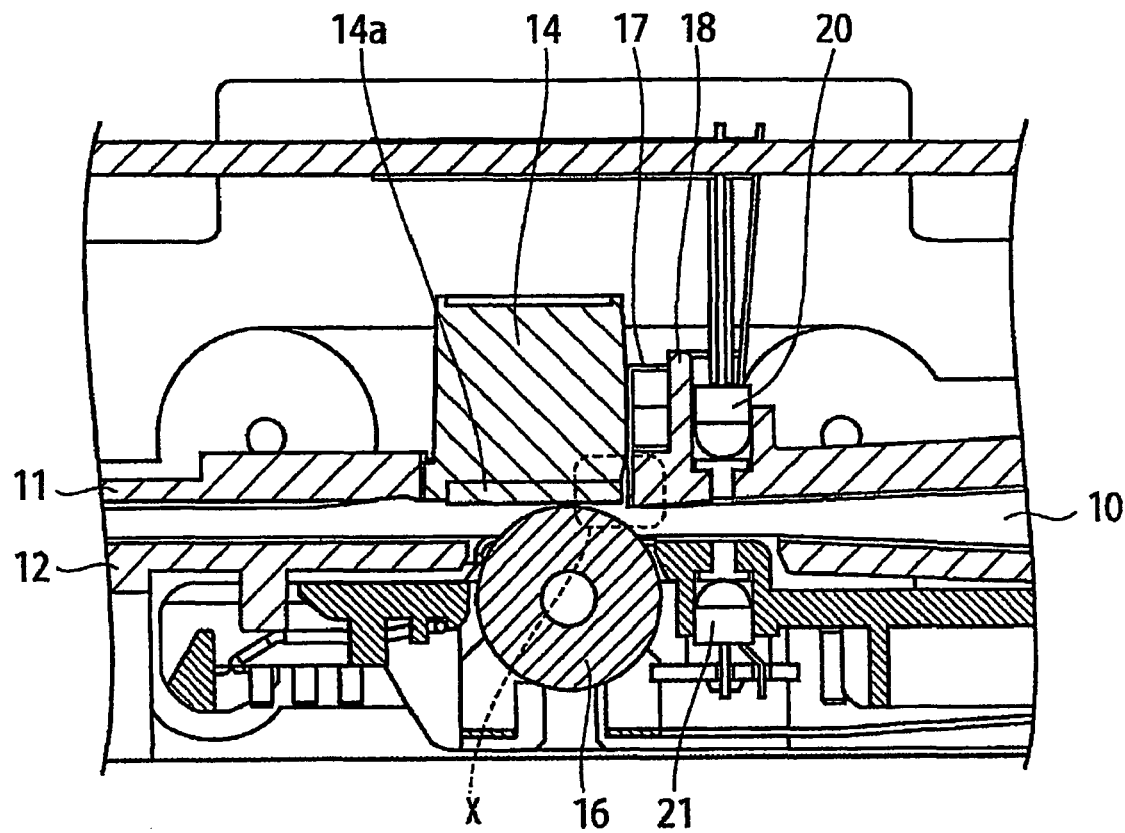
FIGS. 3(a) and 3(b) are cross-sectional views showing a mechanical composition of a section neighboring to an image scanner of the processing device for a card-like recording medium according to the embodiment of the present invention.
Figure 3B:
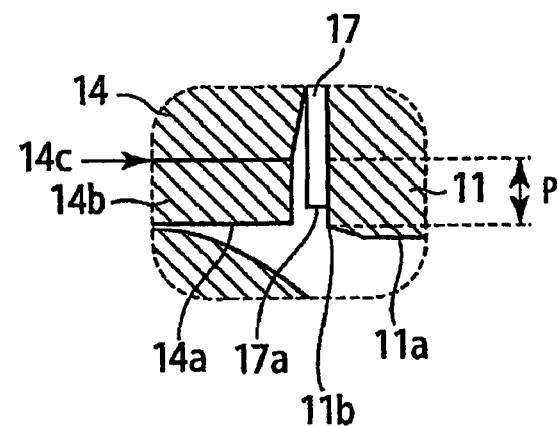

FIG. 3A is a cross-sectional view showing a mechanical composition of a section neighboring to the image scanner 14 of the information processing device 1 for a card-like recording medium according to the embodiment of the present invention. FIG. 3B is a magnified view of the section 'X' in FIG. 3A.

In FIGS. 3A and 3B, the first frame 11 includes a guide 11a (Refer to FIG. 3B) protruding into the path 10. The guide 11a is so formed as to be gently sloped down as it comes close to the scanning surface 14a; i.e., a section of the guide 11a protrudes more into the first frame 11 than a guide tip 11b does. When traveling through the path 10, the card-like recording medium passes along the guide 11a, and subsequently it is so pressed by the roller 16 in a direction toward the scanning surface 14a as to travel while keeping a constant distance from the scanning surface 14a. The guide 11a works to keep the constant distance of the card-like recording medium, traveling through the path 10, from the scanning surface 14a so that information of the card-like recording medium can be read further correctly.

For correctly reading an image (information) recorded on the card-like recording medium, it is preferable to shorten the distance of the card-like recording medium from the scanning surface 14a. However, shortening the distance of the card-like recording medium from the scanning surface 14a may bring the card-like recording medium in contact with the scanning surface 14a. Then, repeating the travel of the card-like recording medium may possibly cause damages on the scanning surface 14a. If once the scanning surface 14a has any damages, an image is read through the damages and it impairs correct reading. When the guide 11a protrudes into the path 10, there can exist a distance between the card-like recording medium and the scanning surface 14a. Thus, repeating the travel of the card-like recording medium does not cause any damage on the scanning surface 14a, and therefore reading further correctly can be maintained.

Figure 4:
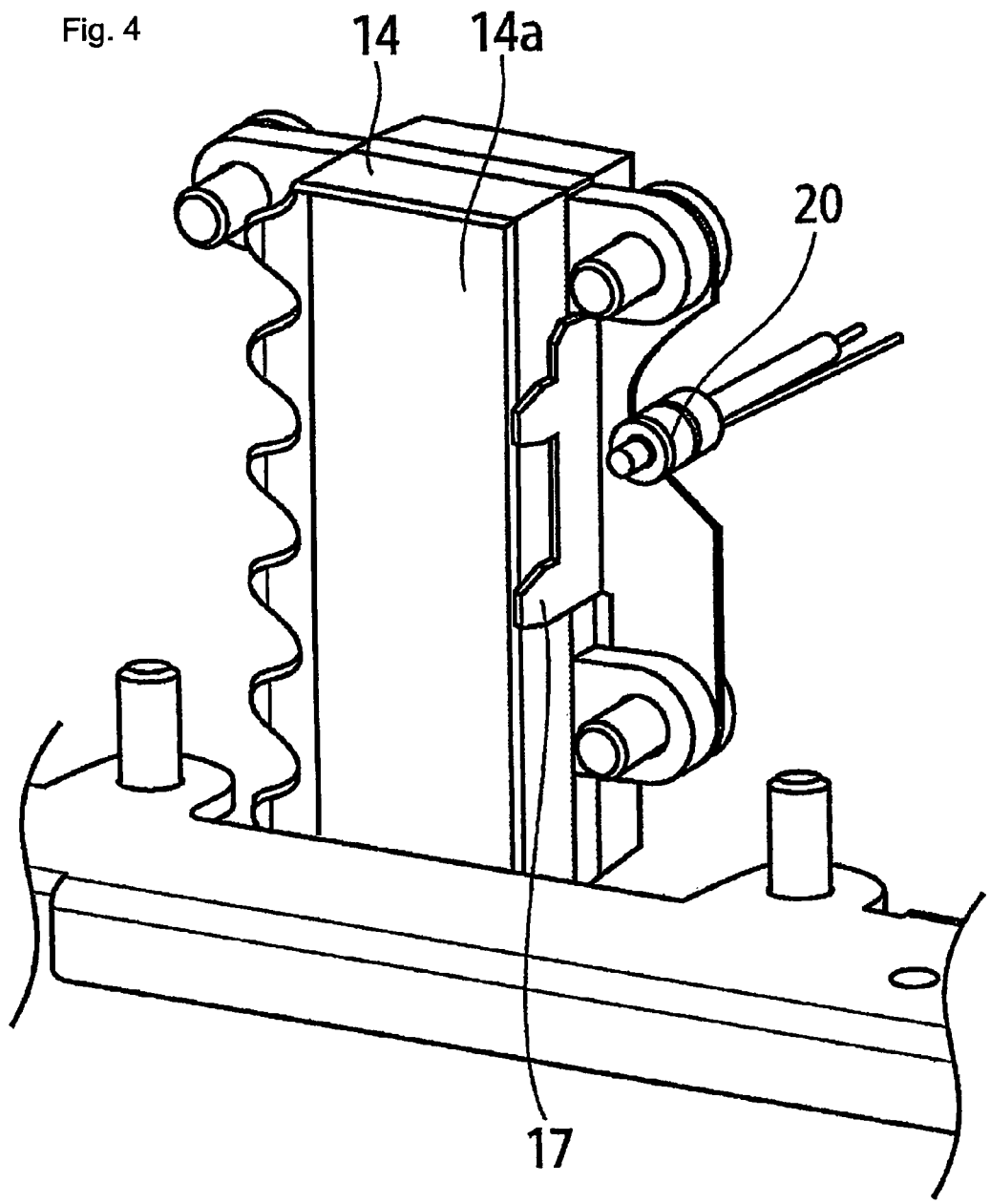
FIG. 4 is a schematic view showing a composition of the section neighboring to the image scanner of the processing device for a card-like recording medium according to the embodiment of the present invention.

As shown in FIG. 3 and FIG. 4, a conductive member 17 is placed between the contact-type image scanner 14 and the read start sensor 20. FIG. 4 is a schematic view showing a composition of a section neighboring to the image scanner 14 of the information processing device 1 for a card-like recording medium according to the embodiment of the present invention. In FIG. 4, several components such as the first frame 11 and the guide 11a are not shown. The conductive member 17 is just an example as a means of removal of static electricity that removes static electricity charged in the card-like recording medium.

The conductive member 17 is so placed as to be present at the path 10. Protrusions 17a (convex parts) of the conductive member 17 are positioned at an inner side (an upper side in FIG. 3B) of the first frame 11 in comparison with the scanning surface 14a of the contact-type image scanner 14 (See FIG. 3B). Thus, the card-like recording medium traveling through the path 10 is not damaged by the conductive member 17, while the static electricity charged in the card-like recording medium is discharged to the conductive member 17 present at the path 10.

Incidentally, it is preferable that, being compared with an adhesive surface 14c between the glass plate constituting the scanning surface 14a and the contact-type image scanner 14 (the adhesive surface 14c being most likely to attract static electricity), the protrusions 17a (convex parts) of the conductive member 17 are protruded further (positioned at a closer side) toward the path 10 (a side lower than the adhesive surface 14c in FIG. 3B). When the conductive member 17 is positioned at a closer side toward the path 10 in comparison with the adhesive surface 14c, the conductive member 17 becomes prone to attract static electricity and prevents static electricity from breaking in through the adhesive surface 14c so that the static electricity can be discharged further surely.

The protrusions 17a (convex parts) of the conductive member 17 may be positioned so as to protrude further into the path 10 than the scanning surface 14a (at a position lower than the scanning surface 14a in FIG. 3B) while the position being at an inner side in the first frame 11 in comparison with the guide tip 11b of the guide 11a (i.e., a position upper than the guide tip 11b in FIG. 3B). When the conductive member 17 is positioned to be still closer toward the path 10, the conductive member 17 becomes more prone to attract static electricity.

Thus, if the protrusions 17a (convex parts) of the conductive member 17 are protruded further (positioned at a closer side) toward the path 10 in comparison with the adhesive surface 14c of the contact-type image scanner 14 while the protrusions 17a being still at an inner side in the first frame 11 in comparison with the guide 11a as well as the guide tip 11b of the guide 11a so as to be positioned within a range 'P' shown in FIG. 3B, the static electricity can be discharged further surely without causing any damage on the card-like recording medium.

The conductive member 17 is connected to the path 10 with a cable that is not shown. Meanwhile, by using another cable that is not shown, the path 10 is connected to a ground terminal of the control board 13 (a circuit board) placed in the first frame 11. For grounding, the ground terminal of the control board 13 is connected to a frame ground for interface cables such as a USB cable.

Thus, using the conductive member 17 allows static electricity charged in the card-like recording medium to get discharged to the frame ground for sure. Therefore, the information processing device 1 for a card-like recording medium can be manufactured not with a conductive material but with an inexpensive material such as a resin. Eventually this disposition results in weight saving of the device and reduction in the production cost. Incidentally, the conductive member 17 is just an example as the neutralizing means.

FIGS. 5A through 5D show a form of the conductive member 17. FIGS. 5A, 5B, 5C, and 5D are a perspective view, a plan view, an elevation view, and a side view, respectively, of the conductive member 17.

In FIGS. 5A through 5D, the conductive member 17 according to the present embodiment includes two protrusions 17a protruding in a direction toward the path 10, and tips of the two protrusions 17a are pointed. Being equipped with the pointed tips, the protrusions can easily attract static electricity, and therefore the static electricity charged in the card-like recording medium can be discharged further effectively. Moreover, the conductive member 17 having multiple protrusions can attract static electricity more easily than any other conductive member having a single protrusion, and therefore static electricity can be discharged more effectively.

Figure 5A:
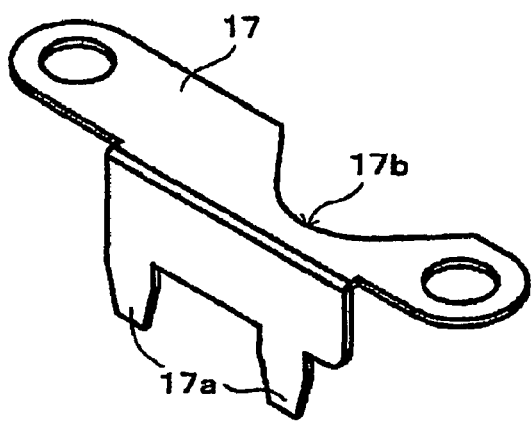
FIGS. 5(a) through 5(d) show a form of a conductive member.
Figure 5B:
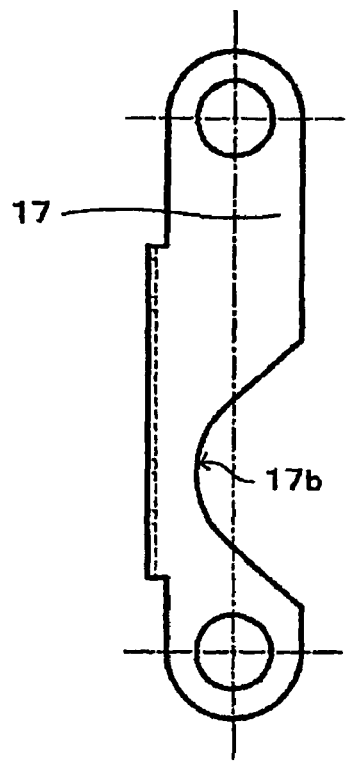
Figure 5C:
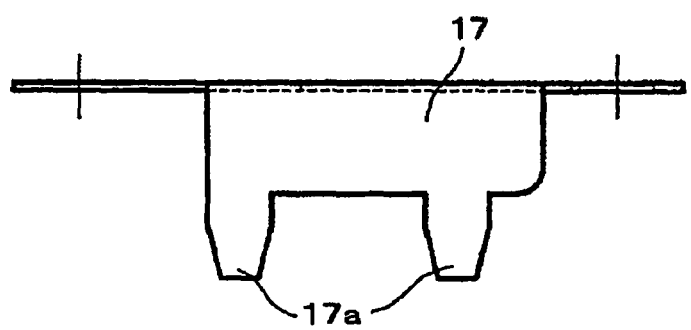
Figure 5D:
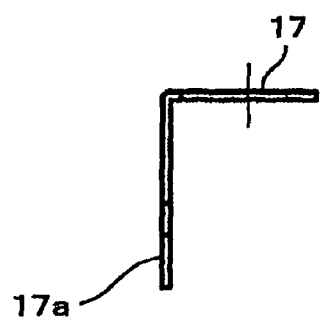

The conductive member 17 according to the present embodiment has a cutout 17b, being almost semicircular, in a mounting section to contact with the first frame 11 (Refer to FIGS. 5A and 5B). With the cutout 17b, the conductive member 17 can be placed so as to surround the read start sensor 20 (Refer to FIG. 1 and FIG. 4). Accordingly, a distance between the read start sensor 20 and the contact-type image scanner 14 can be more shortened. An interval after detection by the read start sensor 20 until image capturing by the contact-type image scanner 14 can be shortened, and therefore power consumption can decrease.

When the distance between the read start sensor 20 and the contact-type image scanner 14 is shortened as described above; a distance from the conductive member 17, located between the above-referenced two components, to the read start sensor 20 also becomes shortened. Accordingly, there appears a possibility that the static electricity discharged to the conductive member 17 is secondarily discharged to the read start sensor 20 to break down the sensor 20. To avoid the danger, an insulating wall 18 made of an insulating material is placed between the read start sensor 20 and the conductive member 17 (See FIG. 1 and FIG. 3). In the present embodiment, the insulating wall 18 includes a cylindrical insulating material part surrounding the read start sensor 20 and an elevated part at a side of the conductive member 17, for preventing the static electricity discharged to the conductive member 17 from being discharged secondarily to the read start sensor 20. It is further preferable that the insulating wall 18 is taller than the conductive member 17.

As described above, in the information processing device 1 for a card-like recording medium according to the embodiment of the present invention, the conductive member 17 placed between the contact-type image scanner 14 and the read start sensor 20 prevents the static electricity charged in the card-like recording medium from being discharged to the contact-type image scanner 14, and therefore it enables prevention of malfunction and breakdown owing to the static electricity.

Since the conductive member 17 enables discharging the static electricity for sure, it becomes possible to construct the entire device with an inexpensive material such as a resin to result in weight saving and production cost reduction of the information processing device 1 for a card-like recording medium.

Furthermore, including the frames equipped with the guide 11a and the roller 16, this disposition makes it possible to keep the distance between the scanning surface and the card-like recording medium constant at the time when the information processing device reads information recorded on the card-like recording medium, and ensures more precise scanning operation.

The processing device for a card-like recording medium according to the present invention is useful for its performance of preventing malfunction and breakdown of the imaging means owing to the static electricity charged in the card-like recording medium.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A processing device for a recording medium comprising:
    a path for transferring the recording medium;
    a frame including a first frame and a second frame, the first and second frames facing each other and sandwiching the path;
    a detector structured to detect presence of the recording medium traveling through the path, the detector being present at the path; and
    an imager structured to capture an image recorded on the recording medium, the imager being present at the path;
    wherein the detector is placed in the frame before the imager in a transfer direction of the recording medium, and
    the information processing device further comprises a neutralizing member structured to remove of static electricity charged in the recording medium, the neutralizing member being placed between the imager and the detector;
    wherein the imager comprises a cover made of an optically-transparent material, and one side of the cover is a scanning surface while an other side of the cover is an adhesive surface; and
    the neutralizing member is so placed as to be present at the path, being protruded further toward the path in comparison with the adhesive surface between the cover and the imager, and still being at a closer position in the path toward the first frame in comparison with the scanning surface.

2. The processing device for a recording medium according to claim 1:
    wherein the imager comprises a scanning surface for reading the image recorded on the recording medium, and the imager is so placed as to have the scanning surface being present at the first frame;
    the second frame comprises a pressing member, which faces the scanning surface across the path and is structured to press the recording medium in a direction toward the scanning surface while the recording medium traveling through the path; and
    furthermore the first frame comprises a guide for keeping a distance of the recording medium from the scanning surface constant while the recording medium travels through the path.

3. The processing device for a recording medium according to claim 2:
    wherein the imager is a contact-type line sensor.

4. The processing device for a recording medium according to claim 2:
    wherein a part of the second frame facing the scanning surface is able to get opened freely.

5. The processing device for a recording medium according to claim 1:
    wherein the imager becomes enabled for image capturing according to an output from the detector.

6. The processing device for a recording medium according to claim 1:
    wherein a wall made of an insulating material is placed between the detector and the neutralizing member.

7. The processing device for a recording medium according to claim 1:
    wherein the neutralizing member is made of a material for removing static electricity, the material being formed to have sharp tips toward the path.

8. The processing device for a recording medium according to claim 1:
    wherein the information processing device further comprises a circuit board placed in the frame; and
    the neutralizing member is connected to a ground terminal of the circuit board by using a cable.

9. The processing device for a recording medium according to claim 1:
    wherein the frame is constructed with the first frame, the second frame, and a transfer base level existing between the first frame and the second frame, the frame being U-shaped.

10. A processing device for a recording medium comprising:
    a path for transferring the recording medium;
    a frame including a first frame and a second frame, the first and second frames facing each other and sandwiching the path;
    a detector structured to detect presence of the recording medium traveling through the path, the detector being present at the path; and
    an imager structured to capture an image recorded on the recording medium, the imager being present at the path;
    wherein the detector is placed in the frame before the imager in a transfer direction of the recording medium, and
    the information processing device further comprises a neutralizing member structured to remove of static electricity charged in the recording medium, the neutralizing member being placed between the imager and the detector;
    wherein a wall made of an insulating material is placed between the detector and the neutralizing member.

* * * * *